Aug. 18, 1936.  G. H. SMITH  2,051,350

VALVE

Filed July 28, 1932  2 Sheets-Sheet 1

Fig. 3.<sup>a</sup>

INVENTOR
George H. Smith
by E. L. Greenewald
ATTORNEY

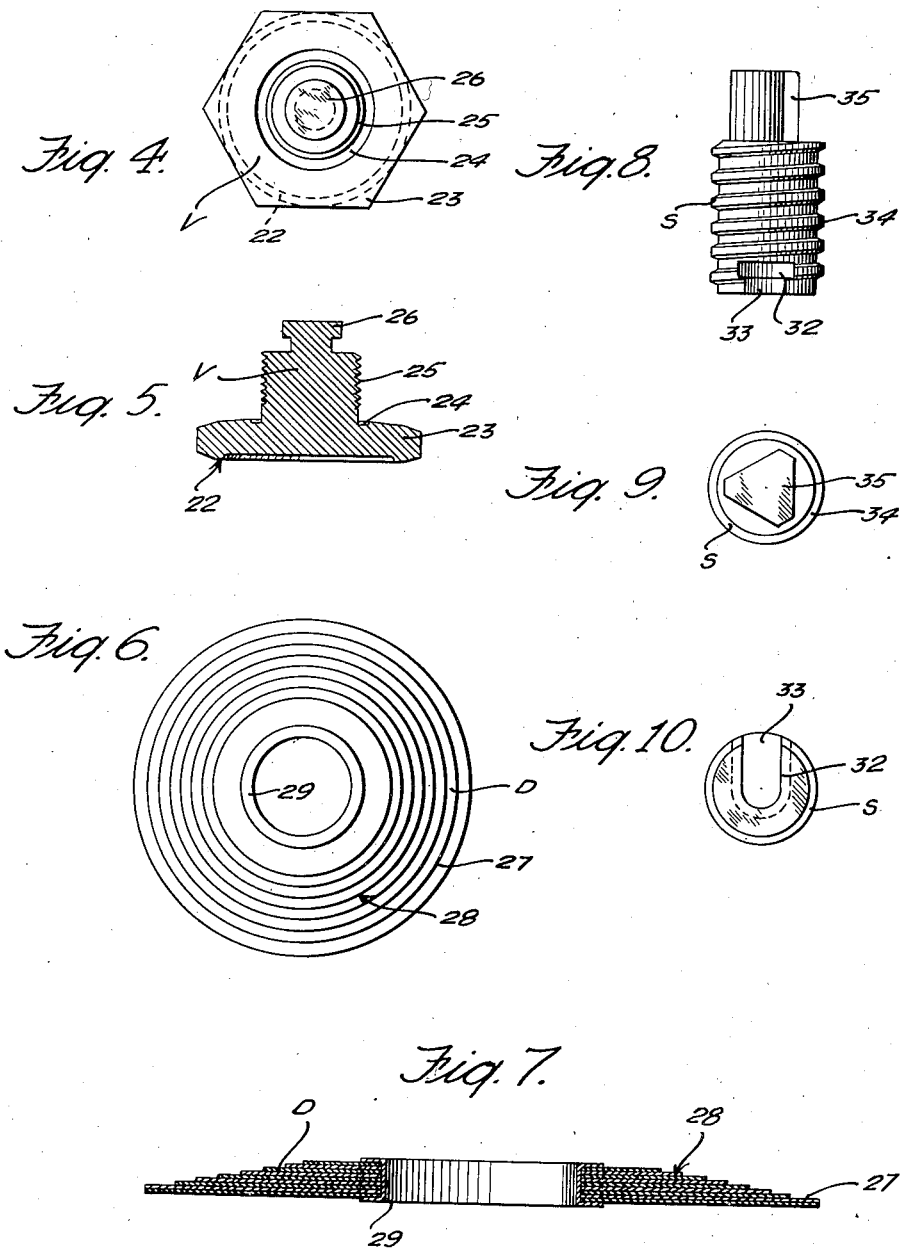

Patented Aug. 18, 1936

2,051,350

UNITED STATES PATENT OFFICE 2,051,350

VALVE

George H. Smith, Kenmore, N. Y., assignor, by mesne assignments, to Union Carbide and Carbon Corporation, a corporation of New York Application July 28, 1932, Serial No. 625,359

13 Claims. (Cl. 251—31)

This invention relates to improvements in valves, particularly those for controlling high pressure gases.

It has been found that valves employed on gas lines which deliver oxygen or acetylene for welding or cutting purposes are often subjected to severe wear by foreign particles in the gas. When a hard particle lodges between the valve and its seat, a greater pressure than usual is required to close the valve. The particle crushes, but as it does so, it is very apt to score one or the other of the valve parts. After several particles have acted in this way the valve becomes no longer gas-tight when it is closed.

In valves that make use of diaphragms instead of packing to seal the valve chamber I have noticed a tendency for leaks to develop, especially after an appreciable length of service. This has been largely due to the method by which such diaphragms have been clamped or held in place.

It is an object of my invention to insure in a valve a tight seating area by constructing the valve seating parts of exceptionally hard material and grinding the seating areas to optical flats.

Another object of my invention is to prevent in a valve the leakage of gas by providing a diaphragm so clamped between parts of the valve that a gas-tight joint is always maintained even after long service.

A further object of my invention is to provide in a valve a quick opening feature by making the area of the valve seating surfaces relatively great and reducing the lift necessary to obtain full line capacity.

These and other objects as well as the novel features of this invention will appear in the following description and in the accompanying drawings.

Fig. 3a is an enlarged portion of the valve nozzle showing the flat seating surface.

Figs. 4 and 5 show, respectively, a top view and a central cross section of the valve element.

Figs. 6 and 7 show, respectively, a plan and an enlarged sectional view of the diaphragm assembly.

Figs. 8, 9, and 10 show, respectively, a side view and end views of the valve operating screw.

Figure 1:
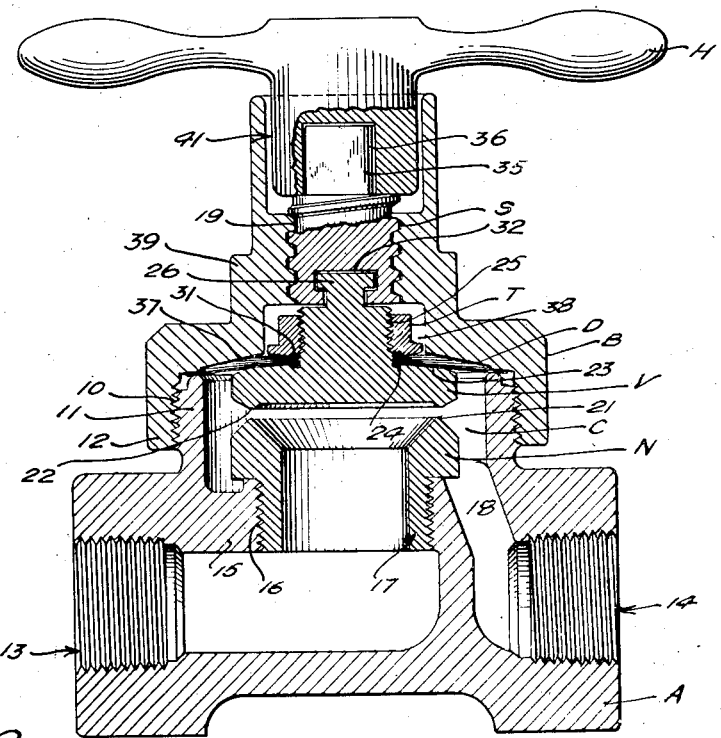
Fig. 1 is a central vertical view illustrating, mainly in section, a valve embodying this invention.

As shown in Fig. 1, the improved valve may comprise a casing consisting of a body A and a cap B, which are detachably coupled together by cooperating screw threads 10 on the exterior of a circular lip 11 of the body A and on the interior of a flange 12 of the cap, respectively. The body A is provided with an inlet 13 and an outlet 14 which may be tapped and in alignment. A partition 15 between the inlet and outlet has a tapped opening 16 to fit the externally threaded section 17 of a tubular nozzle member or seating element N. Nozzle member N mounted in the partition 15 projects into a valve chamber C which communicates through a passage 18 with the outlet 14. The top of the valve chamber is provided with a gas-tight closure comprising a diaphragm D, a valve element V and a nut T that clamps the center of the diaphragm to the valve V. The valve V is moved against or away from the nozzle N by rotating screw S that is threaded into a central opening 19 in the cap B. The inner end of the screw S is detachably and rotatably connected to the valve V and its outer end carries an operating handle H.

The body A furnishes a means for passage of gas from the inlet opening through the opening 16 and nozzle N into the valve chamber C and thence through the inclined channel 18 to the outlet opening.

Figure 2:
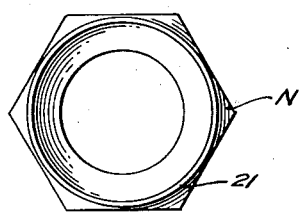
Figs. 2 and 3 show, respectively, a top view and a central cross section of the valve nozzle disclosed in Fig. 1.
Figure 3:
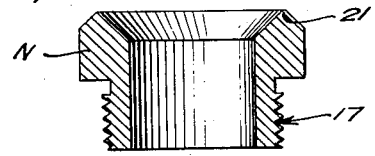
Figure 3:
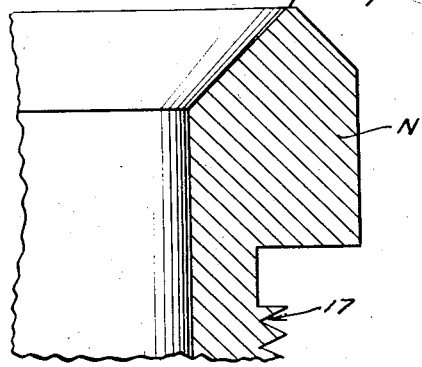

As shown in Figs. 2 and 3 the nozzle N is drilled to a large diameter and countersunk at the top. The outer edge of the top portion of the nozzle is hexagonal in shape and is chamfered to form a narrow seating area 21. The seating area is ground to an optical flat and because of its narrow width may be readily ground to give a close fit with the valve element V.

The valve element V is also countersunk at the bottom and chamfered on the outer edges to form a raised seat 22 which is slightly wider than that of the nozzle. The raised seat is also ground to an optical flat to give an area of uniform contact with the nozzle. Above the seat is a shoulder 23 curving upward to an annular groove 24 at the bottom of a threaded stem portion 25. The outside of the valve element is made hexagonal in shape to receive a wrench. At the top of the stem a circular key 26 is formed so as to provide a means of rotatable connection with the operating screw S. The seating surfaces of the element V and nozzle N are of relatively large diameter so that a small lift of the element V opens an area of appreciable size through which gas may flow. The valve therefore may be quickly opened to full line capacity. The outside of the narrow seating surface of the nozzle contacts the center of the wider seating surface of the valve element which extends both inside and outside of the nozzle seating surface, thus insuring a fit between the valve seats even though the valve element may get out of alignment from wear.

The preferred form of the diaphragm D, shown in Figs. 6 and 7, comprises two annular sealing discs 27 of large diameter supported or reinforced by a number of annular discs 28 of consecutively smaller diameter toward the top. The discs are held together by means of a U-shaped annular clip or ferrule 29 which fits the inner edges of the discs and permanently secures them together as a unit. When assembled over the stem 25, the clip fits into the groove 24 in the valve element and into a similar groove 31 that is formed in the nut T. The nut T screws down on the stem 25 and clamps the inner edge of the diaphragm, outside the clip 29, against the shoulder of the valve element to form a gas-tight joint. The outer edge of the sealing discs is likewise tightly clamped between the lip 11 of the body and the inner side of the cap. When the valve is opened the outer edges of the supporting discs make a tight contact with the inner side of the cap and render the valve chamber C even more positively gas-tight.

The operating screw S is illustrated in Figs. 8, 9, and 10. The bottom of the screw is drilled and counterbored to form a keyway 32. A side outlet 33, cut into the keyway, allows the key 26 of the valve element to be slipped into place. The screw is provided with large threads 34 of a considerable pitch that engage the tapped central opening 19 of the cap and cause the valve element to lift quickly with a turn of the screw. The top of the screw is shaped to form a triangular key or stud 35 that will fit a similarly shaped keyway 36 in an operating handle H. This handle may be short with a lever of convenient size.

The cap B is finished on the inside above the screw threads 12 of the flange to an acute angled surface 37 sloping upward. The stepped-back upper area of the diaphragm fits tightly against the angled surface when the valve is opened. The cap is further recessed to form a space 38 that is of slightly larger diameter than the nut T which is guided therein. A shoulder 39 is provided on the cap to afford a means for the cap to be screwed tightly onto the body with a wrench. The opening 19 tapped with threads, extends upward from the space 38 to receive operating screw S. The top portion of the cap is formed into a socket 41 into which the operating handle may be inserted.

The operation of the valve will be evident from the foregoing description. The sealing areas of the nozzle and valve element form a gas-tight contact with one another when together and close the valve. With a small lift of the valve stem gas will flow through the chamber C to the outlet opening. The diaphragm D forms a tightly sealed wall with the valve element between the body and cap and prevents the escape of gas to the air when the valve is open.

The seating surfaces are ground to optical flats in order to insure a fit between the valve seats, even though the valve element V should be shifted from its geometric alignment on account of imperfections in machining or on account of mechanical wear of the parts during operation. The seating surface of the nozzle N is relatively narrow and, when the valve is assembled, is made to contact the approximate center of the wider surface of the valve element V for reasons similar to those given above. A substantially perfect seating area is thus made certain under all operating conditions.

As a material for the valve element and the nozzle I prefer to use a non-corrodible metal harder than steel or a nitrided, surface hardened ferrous alloy such as "Nitralloy", one composition of which contains carbon .30 to .40%, manganese .40 to .60%, silicon .30% maximum, chromium .80 to 1.30% and molybdenum .15 to .25%. As a material for the diaphragm I prefer to employ a non-corrodible flexible metal such as "Everdur" which is an alloy comprising 82 to 96.5% copper, 3 to 15.0% silicon and 0.5 to 0.8% manganese. Other parts may be made of brass or bronze composition suitable for oxygen service.

I claim:

1. A valve comprising, in combination, a stationary annular seating element; a valve element movable axially toward and away from said seating element; said elements having cooperating sealing surfaces which are annular and relatively narrow, the sealing surface of said valve element being wider radially than the sealing surface of said seating element, to insure sealing engagement of said surfaces notwithstanding slight axial misalignments of said elements; and the portions of said elements having said narrow surfaces of different widths consisting of metal harder than steel whereby the closing of the valve will shear and crush foreign particles between said narrow surfaces to further insure sealing engagement of the same; and means for moving said valve element axially toward and away from said seating element to close and to open the valve.

2. A valve as claimed in claim 1, in which the opposed portions of said seating element and said valve element are countersunk within said sealing surfaces, and are chamfered outside said sealing surfaces, and the edges of said sealing surfaces coincide with and are defined by edges of such countersunk and chamfered portions.

3. In a valve, the combination of a valve element having a seating surface on its front face and an annular recess in its rear face, an annular diaphragm having a part fitting in said recess, and means securing said diaphragm to said valve element adjacent the outer edge of said recess.

4. In a valve, the combination of a valve element having a sealing surface on its front face and a groove in its rear face; a diaphragm comprising a plurality of superposed annular discs and a clip securing together the inner edges of said discs; and means whereby said diaphragm is clamped to said valve element, part of said clip projecting into said groove.

5. In a valve, the combination of a valve element, a unitary diaphragm comprising a plurality of superposed discs cut away at the center and means securing together the inner edges of said discs; means for clamping said diaphragm to said valve element; and securing means including a valve cap having a sloping inner surface and a valve body having a lip for clamping the outer edge of said diaphragm therebetween, said sloping surface being engageable by the intermediate portion of the diaphragm to limit the flexing of the latter and the opening movement of said valve element.

6. In a valve, the combination of a valve element having a stem and an annular recess at the foot of said stem, a multiple disc annular diaphragm having means uniting such discs at their inner edges, and a nut fitting said stem and having a recess opposite the recess in said element, said recesses adapted to receive parts of such uniting means and said diaphragm being clamped between said nut and valve element outside said recesses.

7. In a valve, the combination of a valve element, a diaphragm comprising a plurality of superimposed annular discs of progressively smaller diameter, and a valve body; means for clamping the central portion of said diaphragm to said valve element; and a valve cap secured to said body and clamping the outer periphery of said diaphragm to said valve body; said cap having a sloping inner surface adapted to support the outer circumference of said smaller diaphragm discs when said valve element is moved towards said inner surface.

8. In a valve, a casing having an inlet chamber and an outlet chamber, a partition separating said inlet chamber from said outlet chamber; said partition having an opening therein, a valve seat mounted in said opening; a cap; a valve element carried by the cap and adjustable toward and away from said valve seat, means for guiding the valve element during movement thereof toward and from the said seat, including a flexible sealing member composed of superposed annular metal discs of graduated diameter secured together at their inner peripheries, the disc of largest diameter being secured upon the inner wall of the casing to provide a fluid-tight seal, the outer margins of the superposed discs being adapted to abut against an inner surface of the said cap when the valve is in fully opened position.

9. In a valve, a casing, and a cap, the said casing having therein a valve element and a valve seat, the said element and seat having flat cooperating sealing areas, sealing and valve-centering means associated with the said element, including a multiple disc flexible diaphragm composed of a series of superposed annular sealing discs and supporting discs of graduated diameters, secured together as a unit at their respective inner peripheries, the outer margins of said sealing discs forming with the said casing and cap a fluid-tight seal, the supporting discs having free outer margins adapted pressingly to engage the inner surface of the cap when the valve element is spaced from the valve seat, the said sealing areas of the valve element and valve seat being formed of metallic material harder than steel and finished to optical flats.

10. A valve comprising, in combination, a casing having an inlet, an outlet, and a passage connecting the inlet and outlet, a valve chamber between said inlet and said outlet, a valve seat in said passage, a valve element cooperating with the valve seat and adapted for movement axially toward and from the latter, the said valve seat and valve element having cooperating narrow annular flat sealing surfaces of unequal width formed of hard corrosion-resistant metal harder than steel, a flexible diaphragm of corrosion-resistant metal having its outer margin secured to said casing and constituting a portion of the wall of said chamber, said casing comprising a wall having a surface normally spaced from said diaphragm but engageable by a movable portion thereof and serving as an abutment to limit both the extent of opening movement of said valve element and the amount of flexing of said diaphragm.

11. A valve comprising, in combination, a casing having an inlet, an outlet, and a valve chamber between said inlet and said outlet; a flexible diaphragm having its outer margin secured to said casing and constituting a portion of the wall of said chamber; a stationary annular seating element disposed within said casing and having a passage therethrough between said inlet and said outlet; a valve element secured to the central portion of said diaphragm and movable therewith; said seating element and said valve element having cooperating sealing surfaces; and means outside said chamber for operating said valve element and adapted to flex said diaphragm and move said valve element axially of said passage toward and away from said seating element to close and to open the valve; said casing comprising a wall having a surface normally spaced from but engageable by a movable portion of said diaphragm and serving as an abutment to limit both the flexing of said diaphragm and the extent of opening movement of said valve element.

12. A valve as claimed in claim 11, in which said diaphragm comprises a plurality of superposed annular discs of progressively smaller diameter, and the peripheral edges of certain of said discs being adapted to engage said surface of said wall as said diaphragm is flexed.

13. A valve comprising, in combination, a casing having an inlet, an outlet, and a valve chamber between said inlet and said outlet; a flexible diaphragm having its outer margin secured to said casing and constituting a portion of the wall of said chamber; a stationary annular seating element disposed within said casing and having a passage therethrough between said inlet and said outlet; a valve element secured to the central portion of said diaphragm and movable therewith; and means outside said chamber for operating said valve element and adapted to flex said diaphragm and move said valve axially of said passage toward and away from said seating element to close and to open the valve; said seating element and said valve element having cooperating sealing surfaces which are annular and relatively narrow, the sealing surface of said valve element being wider radially than the sealing surface of said seating element, to insure sealing engagement of said surfaces notwithstanding slight misalignments of said elements; and said narrow surfaces of different widths consisting of metal harder than steel, whereby the closing of the valve will shear and crush foreign particles between said narrow surfaces to further insure sealing engagement of the same; said casing comprising a wall having a surface normally spaced from but engageable by a movable portion of said diaphragm and serving as an abutment to limit both the flexing of said diaphragm and the extent of opening movement of said valve element; the maximum movement of said valve element away from said seating element being relatively small compared with the effective diameters of said sealing surfaces but providing a port between the latter of sufficient area to permit full flow of fluid from said inlet to said outlet.

GEORGE H. SMITH.